(No Model.)
M. CONNOR.
HOSE COUPLING.
No. 435,800.  Patented Sept. 2, 1890.
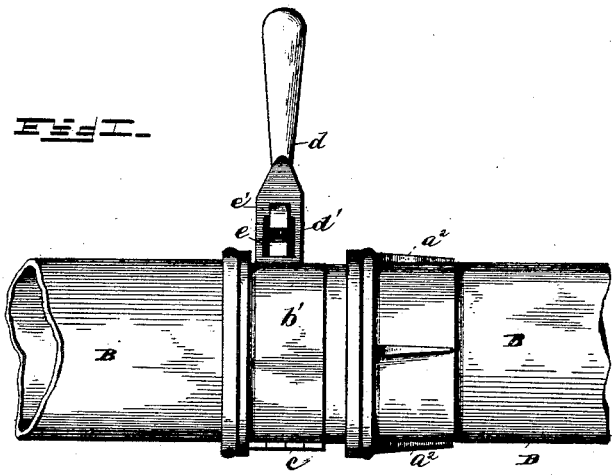
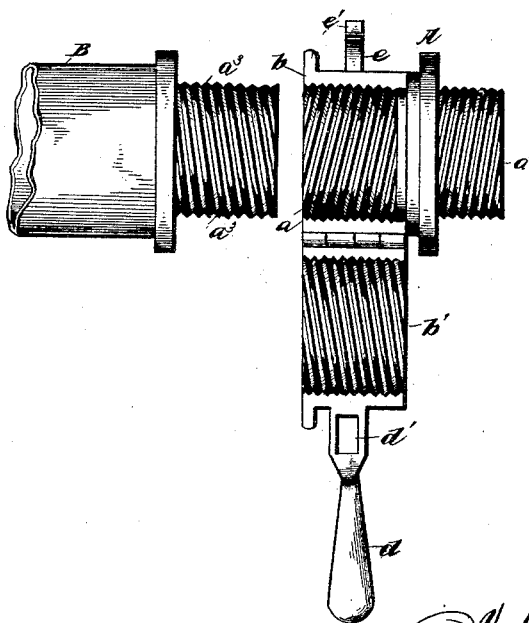
Witnesses
Paul W. Stevens
Andrew Ayers
Inventor
Miles Connor
By Myers & Co.
Attorneys

UNITED STATES PATENT OFFICE.

MILES CONNOR, OF PUEBLO, COLORADO.

HOSE-COUPLING.

SPECIFICATION forming part of Letters Patent No. 435,800, dated September 2, 1890.

Application filed June 6, 1890. Serial No. 354,427. (No model.)

*To all whom it may concern:*

Be it known that I, MILES CONNOR, a citizen of the United States of America, residing at Pueblo, in the county of Pueblo and State of Colorado, have invented certain new and useful Improvements in Couplings for Hose or Water Plugs and for other Purposes, of which the following is a specification, reference being had therein to the accompanying drawings.

My invention has for its object certain new and useful improvements in pipe-couplings, whereby two pipes may be almost instantly coupled and uncoupled, as desired, with great efficiency and durability, as will more fully appear from the following description and accompanying drawings, in which—

Figure 1 is a side elevation of my invention in a coupled position, parts being broken away. Fig. 2 is a plan view of my invention in an uncoupled position.

In the embodiment of my invention I employ a section or joint A, composed of internally and externally screw-threaded ends $a$ and $a'$, the externally-screw-threaded end $a'$ being designed to engage a corresponding screw-threaded sleeve $a^2$, secured to the pipe or hose B. The internally-screw-threaded end or sleeve $a$ is composed of two parts $b$ and $b'$, hinged together at $c$ to allow the two parts or halves to be swung apart. The part $b'$ of the sleeve $a$ has cast integral therewith handle $d$, having a slot $d'$ at its inner end, through which a spring $e$, having a shoulder or head $e'$ on the end thereof, is projected, the shoulder $e'$ engaging the opposite side of the end of the slot $d'$, thus holding the two parts or sections $b\ b'$ of the sleeve $a$ securely together. From this construction it will be seen that by swinging the sections or parts $b\ b'$ of the sleeve $a$ apart and then closing them about an externally-threaded sleeve $a^3$ the coupling of the pipes or hose may be readily and efficiently effected.

Having thus fully described my invention, what I claim, and desire to secure by Letters Patent, is—

The pipe-coupling consisting of the section having the internally and externally screw-threaded ends, said internally-threaded end consisting of two sections hinged together, one of said sections having a spring-catch secured thereto, the other section carrying a slotted handle, the slot in said handle being engaged by said spring-catch, substantially as shown and described.

In testimony whereof I affix my signature in presence of two witnesses.

MILES CONNOR.

Witnesses:
JOHN G. KNEBET,
A. G. HOLLAND.